United States Patent [19]

Jouvaud et al.

[11] Patent Number: 5,302,111

[45] Date of Patent: Apr. 12, 1994

[54] PROCESS AND APPARATUS FOR PULSED COMBUSTION

[75] Inventors: Dominique Jouvaud, Paris; Bernard Genies, Bures Sur Yvette, both of France

[73] Assignee: Frair Liquide, Societe Anonyme Pour L'Etude et L'Exploitation Des Procedes Georges Claude, Paris, France

[21] Appl. No.: 917,278

[22] Filed: Jul. 23, 1992

[30] Foreign Application Priority Data

Jul. 23, 1991 [FR] France .................... 91 09304

[51] Int. Cl.$^5$ .................... F23C 11/04
[52] U.S. Cl. .................... 431/1; 122/24; 431/12
[58] Field of Search .................... 431/1, 12; 122/24; 60/39.38

[56] References Cited

U.S. PATENT DOCUMENTS 3,819,318 6/1974 Pearson .
4,645,448 2/1987 Otto et al. .
4,699,588 10/1987 Zinn et al. .
4,846,665 7/1989 Abbasi .
4,946,381 8/1990 Saito et al. .................... 431/1
4,993,938 2/1991 Thrasher et al. .................... 431/1

FOREIGN PATENT DOCUMENTS

0046898 3/1982 European Pat. Off. .
4026555 2/1991 Fed. Rep. of Germany .
1039966 9/1983 U.S.S.R. .
1498724 8/1989 U.S.S.R. .
WO82/00047 1/1982 World Int. Prop. O. .

Primary Examiner—Edward G. Favors
Attorney, Agent, or Firm—Young & Thompson

[57] ABSTRACT

In at least one of the ducts for feeding a fuel and an oxidant to a burner, a device for flow pulsation is provided to cause in the duct a pulsation of the flow of fluid which is fed at a frequency lower than 3 Hz, typically lower than 1 Hz. Application for example to oxycombustible burners of industrial furnaces having high yield and low emission of nitrogen oxides.

22 Claims, 8 Drawing Sheets

PROCESS AND APPARATUS FOR PULSED COMBUSTION

BACKGROUND OF INVENTION (a) Field of the Invention

The present invention concerns techniques of pulsed combustion where a flame of a burner of an industrial furnace which is supplied with fuel and an oxidant is provided with a pulsation, to cause cyclic variations of at least one of the flows of fuel and oxidant which feeds the burner.

(b) Description of Prior Art

Already known are processes of pulsating combustion, based on the principle of increasing the volume of burned gases. This volume increase acts on devices for controlling the flows of the gases to be burned by causing a decrease of the combustion, and therefore, a decrease of the volume of the burned gases. The upstream pressure of the fluids then reestablishes the flows at their highest value and the combustion increases, thus ensuring a pulsating combustion.

Such a process is described in the document EP-A-0.046.898.

The document SU-A-857.642 describes a device for pulsating air for the combustion of gaseous or liquid fuels which operates on the principle of a paddle wheel mounted on an axis.

It is known that the production of nitrogen oxide, which is harmful to the environment, depends on partial pressures of oxygen, nitrogen, as well as on the temperature of the medium, which is a problem in the case of pure oxygen which is increasingly used in industrial furnaces because of the numerous advantages that it provides. Studies made by the Applicant have shown that, for example, in the case of pure oxygen, the content of nitrogen oxide fumes increases from 180 ppm to 1600 ppm in a so-called adiabatic furnace of 25 KW, where the thermic energy is transmitted to the walls of the furnace and to the fumes produced as a function of a content of nitrogen in the natural gas varying from 2 to 16%. Similarly, the content of nitrogen oxides in the fumes increases from 150 ppm to 500 ppm in a furnace, for example, a furnace for melting glass, where the thermic energy is simultaneously transmitted to the charge, to the walls and to the fumes, as a function of the content of nitrogen in the natural gas used. The Applicant has, on the other hand, observed that, all things being equal, the content of nitrogen oxides in the fumes goes from 700 ppm to 1200 ppm when the content of residual oxygen in the fumes goes from 1% to 4%.

SUMMARY OF INVENTION

It is an object of the present invention to propose a process of pulsed combustion, enabling more particularly, with a fuel which is highly enriched in oxygen, for example, substantially pure oxygen, to reduce the emission of nitrogen oxides.

To do this, according to a characteristic of the invention, the frequency of the cyclic variations of at least one of the flows of fuel and oxidant is lower than 3 Hz, particularly lower than 1 Hz and preferably about 0.2 Hz.

According to other characteristics of the invention:

the ratio between the duration under maximum flow and the duration under minimum flow of the pulsed flow is between 0.5 and 2, preferably of the order of 1;

the volume ratio between a minimum flow and a maximum flow of the pulsed flow is lower than 0.7, typically 0.5, preferably of the order of 0.25;

the volume ratio between a minimum flow and a flow which is combined with pulsations is between 0.1 and 2, preferably of the order of 0.25;

the cyclic variations are induced at least in the flow of fuel and, in the case where the cyclic variations are induced in the flow of fuel and in the flow of oxidant, these cyclic variations are produced at a frequency which is common to both flows by being preferably dephased by at least $\pi:2$.

The fuel contains at least 80% oxygen, and advantageously consists of substantially pure industrial oxygen, the fuel being typically natural gas.

The present invention also concerns devices for pulsed combustion to carry out the above processes, comprising a burner of an industrial furnace connected to at least one duct for supplying fuel and at least one duct for supplying oxidant, in which at least one of the supplying ducts is provided with a pulsating means to provide a pulsation of the flow of fluid supplied by the duct at a frequency lower than 3 Hz.

The present invention also concerns the use of such a device in a furnace for melting glass.

As shown by the experimental results which will be given in more detail later, these characteristics enable to substantially reduce the emission of nitrogen oxides even in the case where pure oxygen is used as oxidant and to maintain the volume content of oxygen in the fumes at a very low value. It can be estimated that the pulsations produced enable to intervene first on the times of residence of the species which are present (co-linear trajectories) and secondly on the meeting times of these species. It is thus possible to act directly on the temperature level due to the fact that, locally, highly over- or under-stoichiometric conditions prevail. The local combustion is therefore carried out in the presence of combustion products from the preceding local combustions and as a result, there is a staging of the combustion mechanism and therefore directly a decrease of the formation of nitrogen oxides.

BRIEF DESCRIPTION OF DRAWINGS

Other characteristics and advantages of the invention will appear from the description which follows of embodiments, given with reference to the annexed drawings, in which.

DESCRIPTION OF PREFERRED EMBODIMENTS

Figure 1:
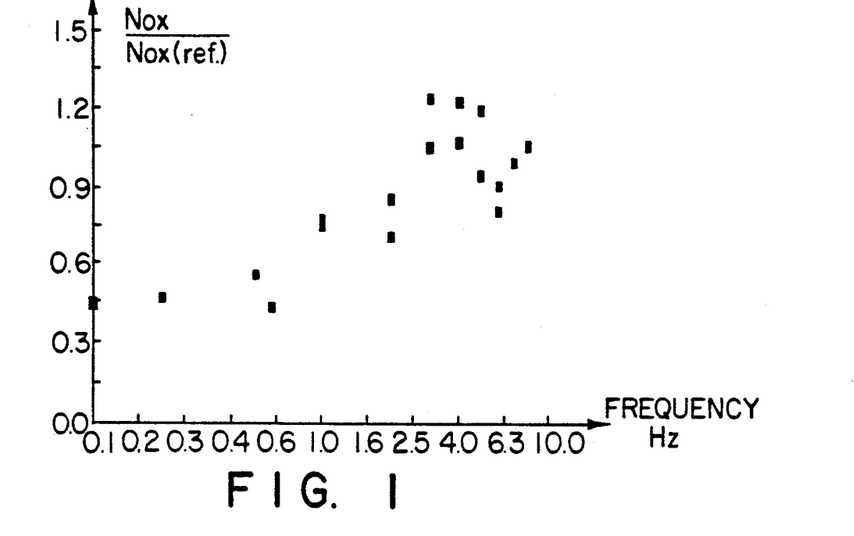
FIG. 1 represents a diagram of the ratio of the nitrogen oxide contents NOx/NOx(ref) with and without pulsation as a function of the frequency of the pulsations made solely on the fuel, such as natural gas.

With reference to FIG. 1, the experimentation corresponds to pulsations provided only on the natural gas fuel, the volume ratio of the minimum flow to the maximum flow of natural gas being 0.23. It is noted that there is a ratio of the emission rate of nitrogen oxides to a reference system without pulsation (NOx(ref)) which varies from 0.5 to 1.2 for a pulsation frequency variation of 0.1 at 10.8 Hz. Below 3 Hz, it is observed that there is a substantial reduction of the emissions of nitrogen oxides, which reaches 50% in the pulsation frequency range between 0.1 and 0.3 Hz.

Figure 2:
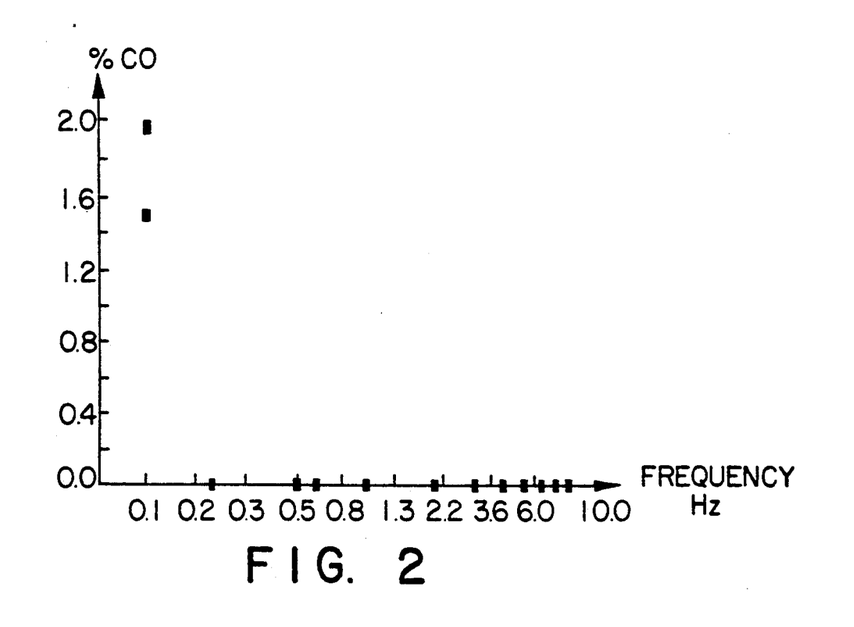
FIG. 2 represents a diagram of the content in percentage of carbon monoxide as a function of the frequency of the pulsations made solely on the fuel, such as natural gas.

Under the same conditions, it is observed, with reference to FIG. 2, that there is nearly no emission of carbon monoxides, except for the very low frequencies, lower than 0.15 Hz.

Figure 3:
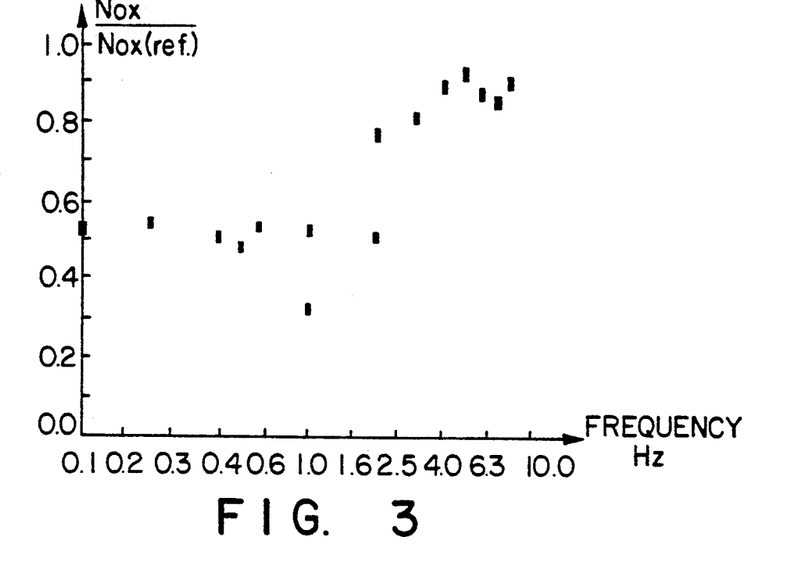
FIGS. 3 and 4 are diagrams corresponding to those of FIGS. 1 and 2, the pulsations being here made only on the oxidant, such as oxygen.
Figure 4:
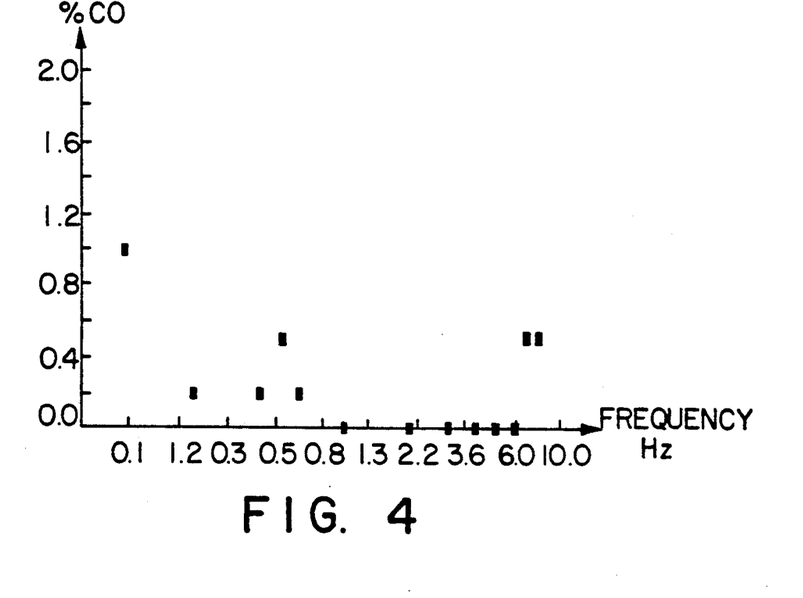

With references to FIGS. 3 and 4, there are similar effects of reduction of the rate of emission of nitrogen oxides and small production of carbon monoxide at very low frequency in the case where there are provided pulsations only on the oxygen oxidant, the optimum range here being between 0.2 and 2 Hz.

Figure 5:
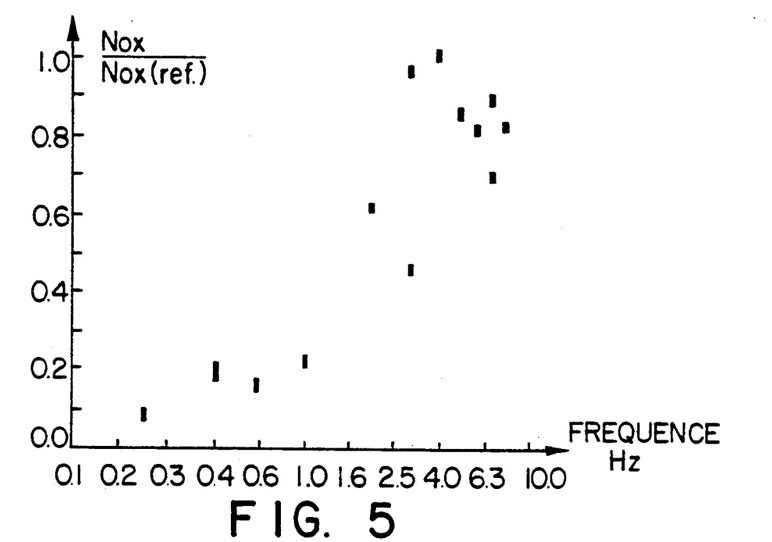
FIGS. 5 and 6 are diagrams corresponding to those of FIGS. 1 and 2, the pulsations being made here simultaneously on the natural gas fuel and on the oxygen oxidant.
Figure 6:
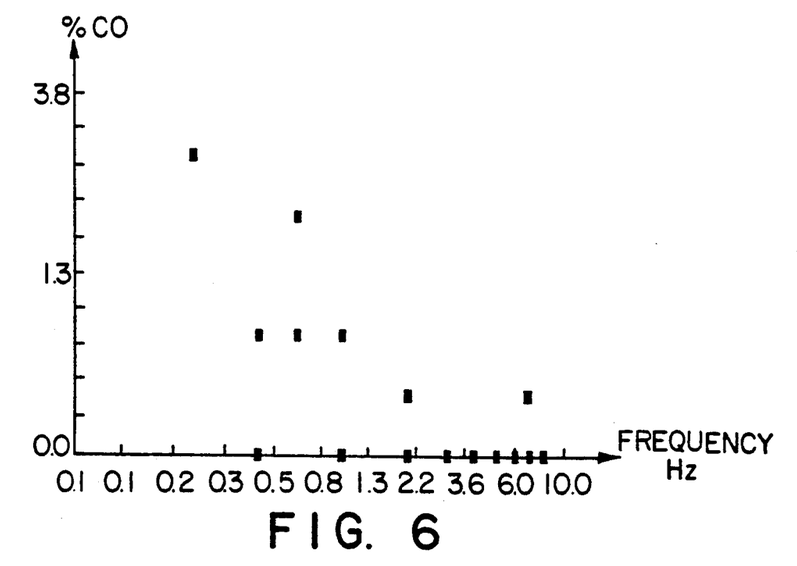

With reference to FIGS. 5 and 6, which correspond to an experiment where pulsations are provided simultaneously on the natural gas fuel and on the oxygen oxidant, it is noted that there is an important reduction of the emissions of NOx for pulsation frequencies lower than 3 Hz, this reduction reaching more than 90% for frequencies between 0.2 and 0.4 Hz with a dephasing of at least $\pi:2$ between the pulsations of the fuel and of the oxidant.

Figure 7:
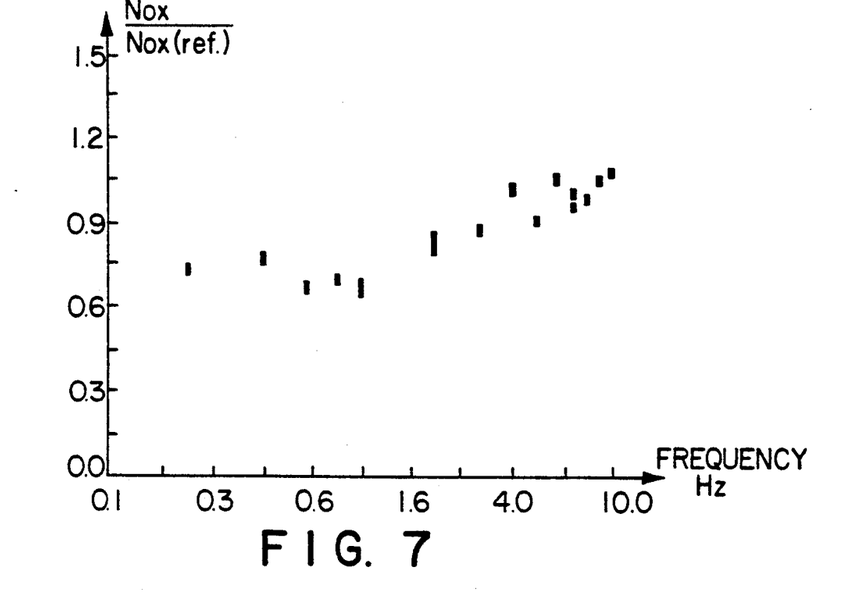
FIGS. 7 and 8 are diagrams analogue to those of FIGS. 1 and 2 with other operating conditions.
Figure 8:
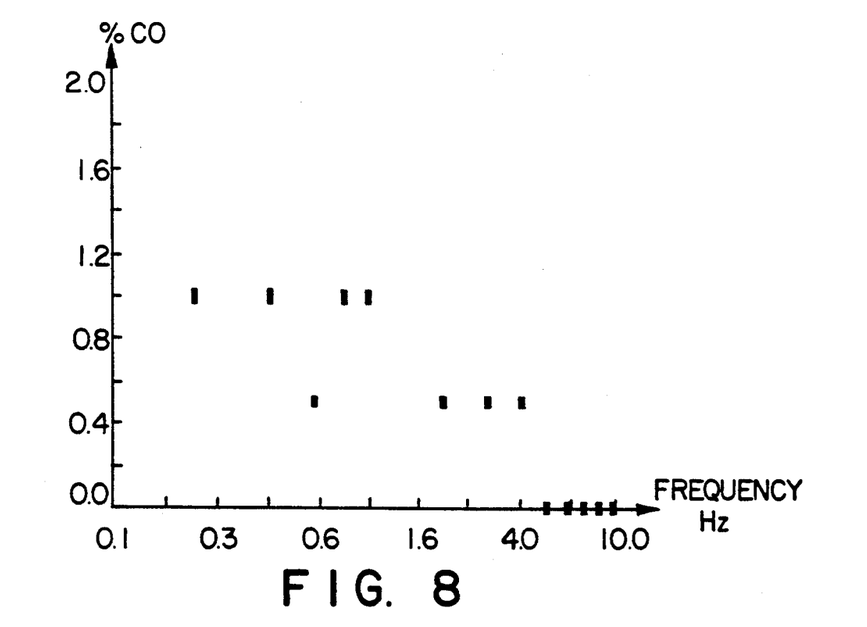

With reference to FIGS. 7 and 8, reduced rates of nitrogen oxides produced in a furnace for melting glass are observed at frequencies lower than 4 Hz with a ratio of the minimum and maximum flows of 0.5 and a duration at minimum flow equal to the duration at maximum flow. The furnace is operated with a minimum flow equal to half the maximum flow, and a dephasing of $\pi$ between the pulsations and the flows, and a duration at minimum flow substantialy equal to that of the maximum flow: there is a reduction of about 40% of the rate of emission of nitrogen oxides.

Figure 9:
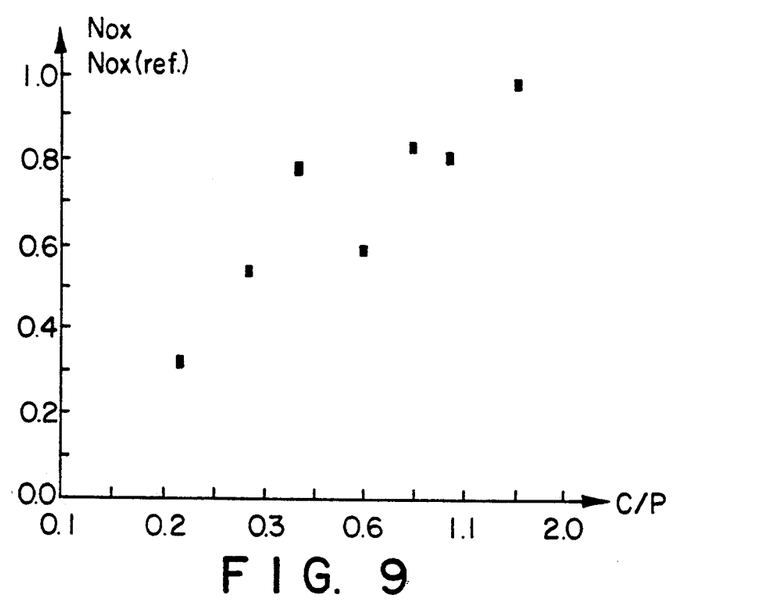
FIGS. 9 and 10 represent diagrams of the ratios NOx/NOx(ref) as a function of the ratio C/D, C being the minimum constant flow and D being the flow with addition of pulsations.
Figure 10:
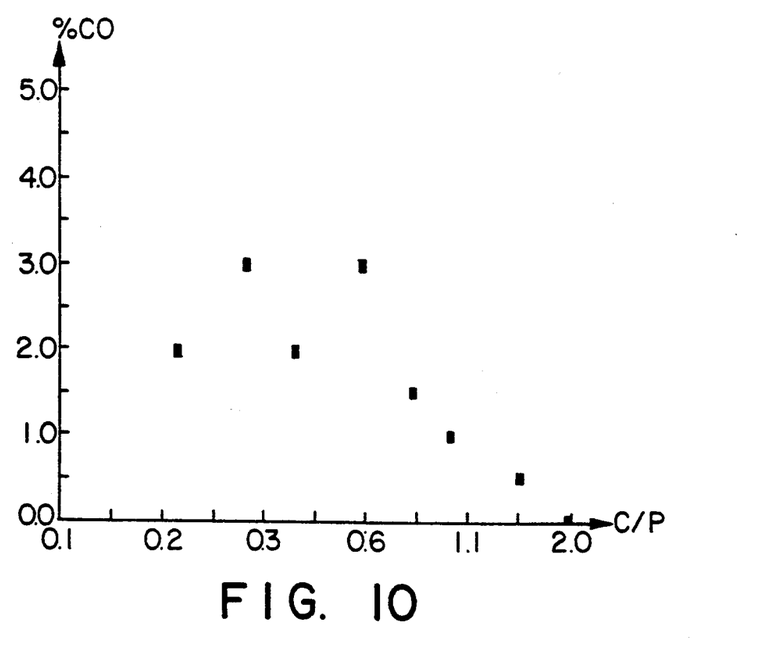

Referring now to the diagrams of FIGS. 9 and 10, which represent in ordinates, respectively the rates of nitrogen oxides and carbon monoxide and, in abscissae, the ratio between the minimum flow and the maximum flow of the pulsations (expressed by C/P corresponding to a ratio between a constant minimum flow and a supplement of pulsation flow), it is seen that for a substantially reduced emission of nitrogen oxides, the ratio C/P should be between 0.1 and 0.3, i.e. the minimum flow/maximum flow ratio should be between 0.5 and 0.2, preferably of the order of 1.

Figure 11:
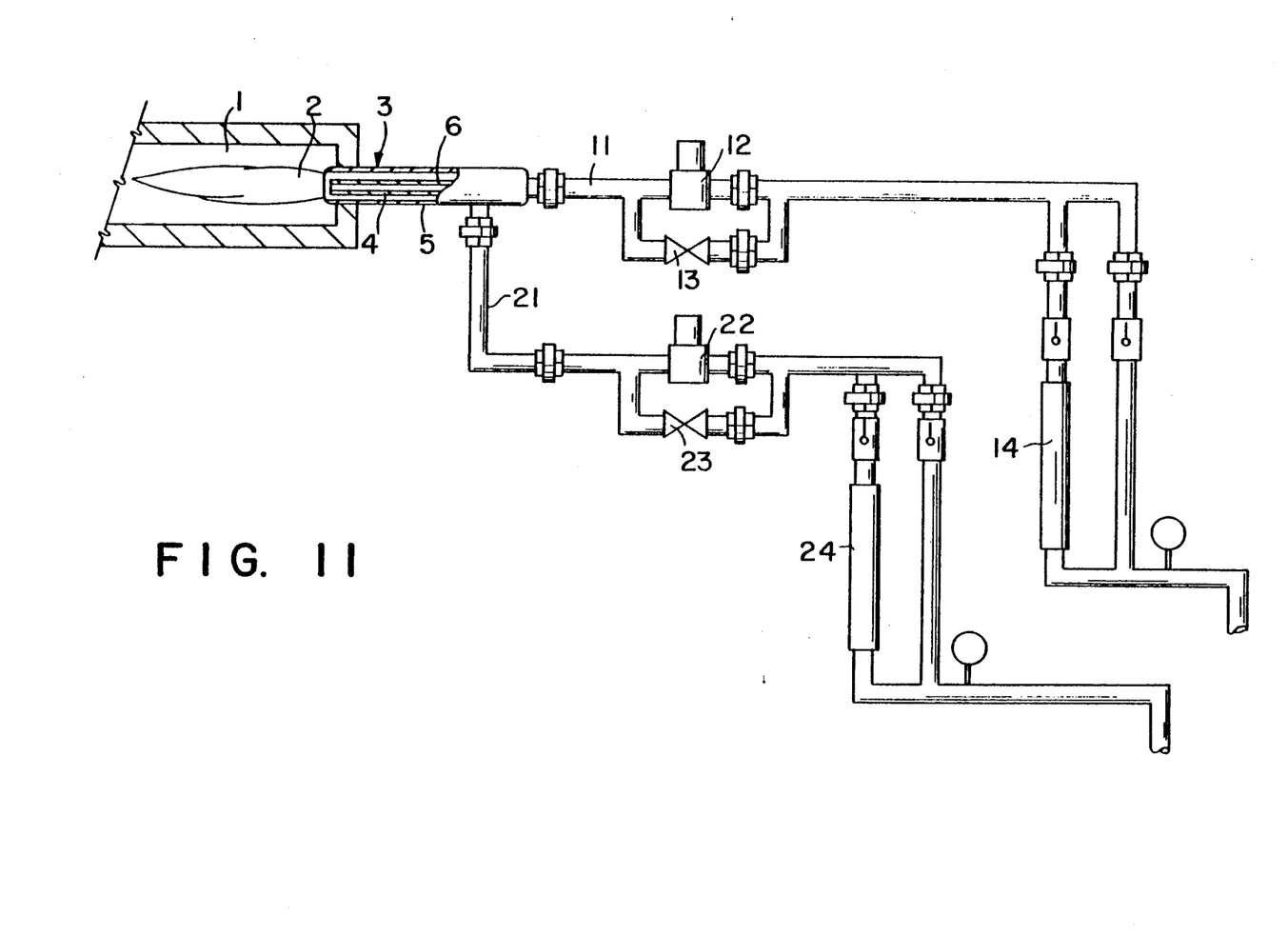
FIG. 11 is a schematic view of an apparatus according to the invention.

On FIG. 11 there is seen a part 1, defining a combustion chamber, of an industrial furnace, for example, a furnace for melting glass, in which a flame 2 is formed by an oxy-combustible burner 3, consisting of a central tube 4 for supplying natural gas surrounded by a concentric tube 5 for supplying oxygen. The tubes 4 and 5 are connected to gaseous sources not illustrated respectively by means of a duct 11, 21, each incorporating a control electro-valve of low frequency 12, 22 which is by-passed by a deviation including a needle valve 13, 23 supplying a given minimum flow. The gas flows are measured, upstream of the valves 12, 13; 22, 23 by means of by-passed rotameters 14, 24. The electro-valves 12 and 22 enable through their cyclic openings and closings, to provide a pulsation of the natural gas and oxygen flows between a minimum flow supplied by the needle valves 13 and 23 (valves 12 and 22 being closed) and a maximum flow corresponding to the full opening of the electro-valves 12 and 22. The same pulsating means may be applied in simplified cases where a pulsation is carried out only on one of the gases supplied to burner 3, typically on the oxidant.

Figure 12:
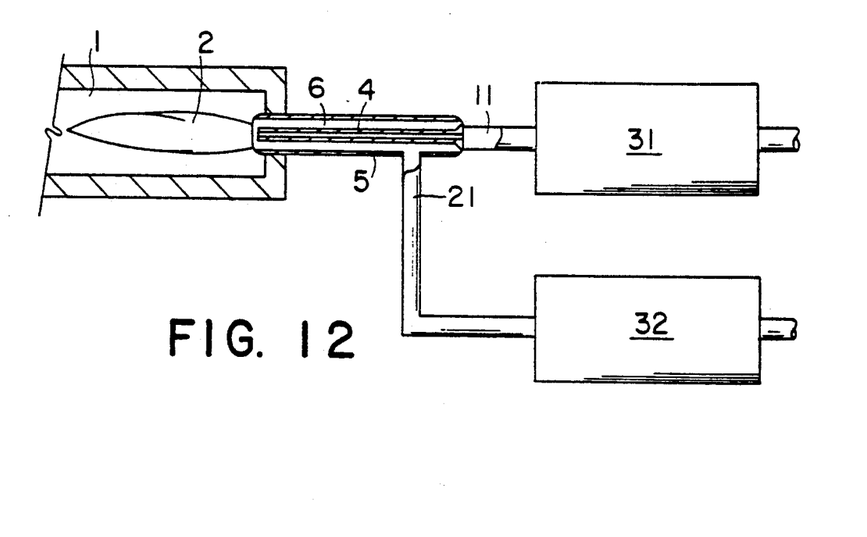
FIG. 12 is a schematic view of a variant of the apparatus.

As a variant, as illustrated in FIG. 12, the pulsating means may consist of electronic flow generators 31, 32.

Figure 13:
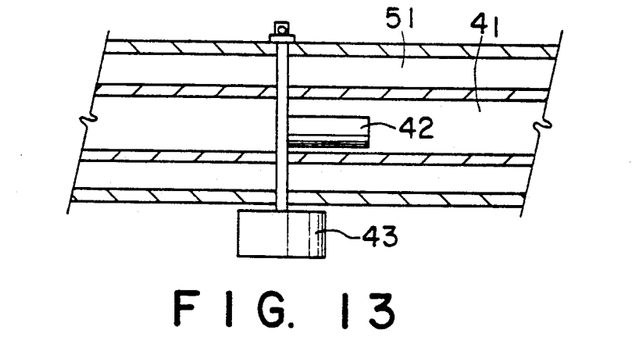
FIGS. 13 and 14 are partial schematic views of another embodiment of pulsating means according to the invention.
Figure 14:
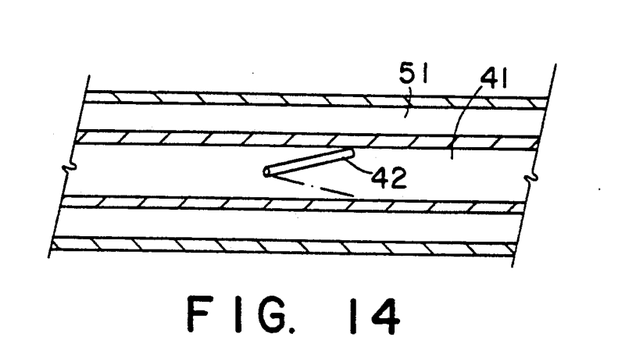

FIGS. 13 and 14 represent a variant of the pulsating means in at least one of the ducts supplying the burner by alternate oscillation of a wing 42 pivotally mounted in a duct 41 for feeding the burner with fuel and cyclically operated by means of an electric motor 43, the duct 51 for supplying the other component for the combustion having no pulsating means.

In the variant illustrated in FIGS. 15 to 18, the pulsating means comprises a rotary valve including a valve body 61 defining internal cylindrical cavity 62 in which arrive aligned inlet and outlet ducts 63 and 64. A tubular rotary valve head 65 is rotatably mounted in cavity 62, the valve head including a tubular wall provided with angularly distributed openings 68 providing therebetween closing wall portions 66, 67 which, during rotation of the valve head 65, sequentially close the ducts 63, 64. The valve head 65 is mounted at the end of a shaft 69 which pivots in the valve body 61 and is caused to rotate continuously or possibly alternatively, by means of a motor (not illustrated). In the case of a pulsation on the two fluids supplying the burner, a common motor may operate the two rotary valves to ensure the pulsation of the flows of fuel and oxidant. Dephasing of the opening/closing of the valves, and consequently of the pulsations of the flows, is carried out by mere adjustment of the driving pinions between the two valves.

Figure 15:
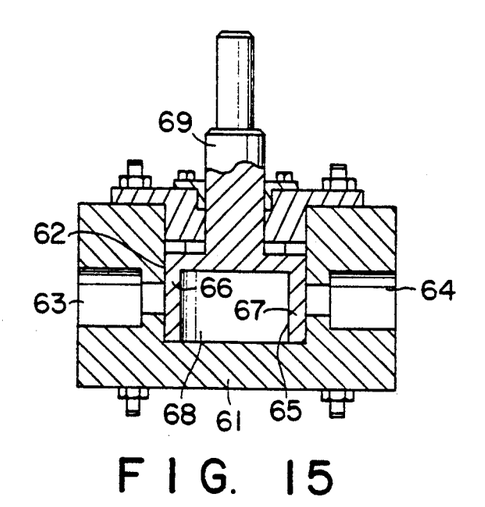
FIG. 15 is a schematic view in cross-section of another embodiment of a pulsating means according to the invention.
Figure 16:
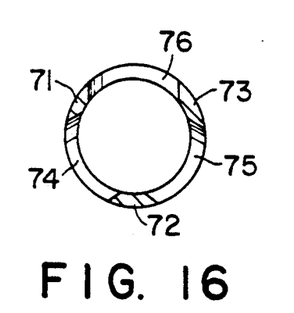
FIGS. 16 to 18 are cross-section views of variants of the rotary tubular valve head of the valve of FIG. 15.
Figure 17:
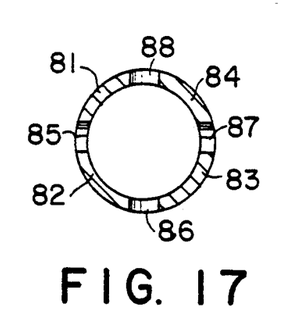
Figure 18:
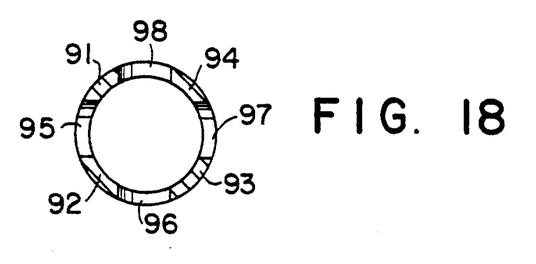

In the embodiment of FIG. 15, the valve head 65 includes two diametrically opposed openings 68. Depending on circumstances, it is possible, however, to modify the ratio of durations between opening and closing by providing valve heads having a different arrangement of openings, as illustrated in FIG. 16 (three openings 74–76 with important angular apertures separating three closing zones 71–73 of small angular extension), FIG. 17 (four small openings 85–88 between four closing walls of wide angular extension 81–84) or FIG. 18 (four openings 95–98 et four closing portions 91–94 having substantially the same angular extension).

Although the present invention has been described with reference to specific embodiments, it is not limited thereto, but on the contrary is capable of modifications and variants which would appear to one skilled in the art.

We claim:

1. Process of pulsed combustion, where a pulsation is provided to a flame of a burner discharging into an industrial furnace which is supplied with fuel and oxidant by producing cyclic variations of at least one of the flows of fuel and oxidant, wherein the oxidant contains at least 80% $O_2$ and the frequency of the cyclic variations is lower than 3 Hz.

2. Process according to claim 1, wherein the frequency is between 0.1 and 1 Hz.

3. Process according to claim 2, wherein the frequency is about 0.2 Hz.

4. Process according to claim 1, wherein the ratio between the maximum flow duration and the minimum flow duration which varies cyclically is between 0.5 and 2.

5. Process according to claim 4, wherein the ratio between the maximum flow duration and the minimum flow duration is of the order of 1.

6. Process according to claim 1, wherein the volume ratio between a minimum flow and a maximum flow which varies cyclically is lower than 0.7.

7. Process according to claim 6, wherein the volume ratio is lower than 0.5.

8. Process according to claim 7, wherein the volume ratio is about 0.25.

9. Process according to claim 7, wherein the volume ratio between a minimum flow and a flow provided with pulsations of the flow which varies cyclically is between 0.3 and 2, preferably of the order of 0.3.

10. Process according to claim 1, wherein the cyclic variations are produced in the flow of fuel.

11. Process according to claim 1, wherein the cyclic variations are produced in the flow of fuel and in the flow of oxidant.

12. Process according to claim 11, wherein the cyclic variations are carried out at a common frequency in the two flows of fuel and oxidant.

13. Process according to claim 11, wherein the cyclic variations of the flows of fuel and oxidant are dephased by at least $\pi:2$.

14. Process according to claim 13, wherein the cyclic variations of the flows of fuel and oxidant are dephased by about $\pi$.

15. Process according to claim 1, wherein the oxidant is substantially pure oxygen.

16. Process according to claim 1, wherein the fuel is a natural gas.

17. An apparatus for flame heating a furnace, comprising at least a burner having at least a first channel connectable via a first supply duct to a source of fuel and a second channel connectable via a second supply duct to a source of oxidant containing not less than 80% $O_2$, the first and second channels discharging into the furnace, at least one of said first and second supply ducts is provided with pulsating means to pulse the flow of fluid supplied by said duct to the burner at a frequency comprised between 0.1 and 3 Hz.

18. The apparatus of claim 17, wherein each of said first and second supply ducts is provided with pulsating means operable to pulse the respective flows with a selectable dephasage.

19. Apparatus according to claim 17, wherein the pulsating means comprises an electro-valve bypassed by a neck with given minimum flow.

20. Apparatus according to claim 17, wherein the pulsating means comprises a pivot wing disposed in the duct and means are provided to produce an alternative oscillation movement of the wing.

21. Apparatus according to claim 17, wherein the pulsating means comprises a valve with a rotary valve head including a tubular wall formed with openings angularly distributed and defining a sequence of openings and closings of the flow of fluid in the valve during rotation of the valve head.

22. Apparatus according to claim 17, wherein the burner comprises two concentric channels for ejecting fuel and oxidant.

* * * * *

UNITED STATES PATENT AND TRADEMARK OFFICE
CERTIFICATE OF CORRECTION

PATENT NO. : 5,302,111
DATED : April 12, 1994
INVENTOR(S) : Dominique JOUVAUD et al.

It is certified that error appears in the above—identified patent and that said Letters Patent is hereby corrected as shown below:

On the title page, in Item 73, the name of the assignee, change "Frair Liquide" to --L'Air Liquide--.

Signed and Sealed this

Second Day of August, 1994

Attest:

BRUCE LEHMAN

Attesting Officer   Commissioner of Patents and Trademarks